(12) United States Patent
Allen, IV et al.

(10) Patent No.: US 10,802,453 B2
(45) Date of Patent: Oct. 13, 2020

(54) ROBOTICS PROCESS AUTOMATION MACRO BOT

(71) Applicant: Bank of America Corporation, Charlotte, NC (US)

(72) Inventors: Nye Walter Allen, IV, Matthews, NC (US); Vinaykumar Mummigatti, Charlotte, NC (US); Ryan Eric Davis, Dallas, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 16 days.

(21) Appl. No.: 15/612,164

(22) Filed: Jun. 2, 2017

(65) Prior Publication Data

US 2018/0345489 A1    Dec. 6, 2018

(51) Int. Cl.
*B25J 9/16*         (2006.01)
*G05B 19/042*       (2006.01)

(52) U.S. Cl.
CPC .......... *G05B 19/0421* (2013.01); *G05B 2219/25389* (2013.01)

(58) Field of Classification Search
CPC .......... G05B 19/0421; G05B 2219/25389
USPC .............................. 700/218, 225, 228
See application file for complete search history.

(56) References Cited

U.S. PATENT DOCUMENTS

| | | | |
|---|---|---|---|
| 5,737,498 A | 4/1998 | Murray et al. | |
| 5,801,945 A | 9/1998 | Comer et al. | |
| 6,292,715 B1 | 9/2001 | Rongo | |
| 6,330,493 B1 | 12/2001 | Takahashi et al. | |
| 6,522,951 B2 | 2/2003 | Born et al. | |
| 6,898,484 B2 | 5/2005 | Lemelson et al. | |
| 7,010,390 B2 | 3/2006 | Graf et al. | |
| 7,117,067 B2 | 10/2006 | McLurkin et al. | |
| 7,454,469 B2 | 11/2008 | Zhou et al. | |
| 8,112,176 B2 | 2/2012 | Solomon | |
| 9,122,531 B2 * | 9/2015 | Duarte | H04L 41/0803 |
| 9,195,233 B2 | 11/2015 | Perrone | |
| 9,300,683 B2 * | 3/2016 | Rapaport | H04L 63/1441 |
| 9,555,544 B2 | 1/2017 | Bataller et al. | |
| 2004/0205772 A1 * | 10/2004 | Uszok | H04L 29/06 719/317 |
| 2007/0208442 A1 | 9/2007 | Perrone | |
| 2008/0133210 A1 | 6/2008 | Chagoly et al. | |

(Continued)

*Primary Examiner* — Michael Collins
(74) *Attorney, Agent, or Firm* — Michael A. Springs; Moore & Van Allen PLLC; Seongun M. Hong (57) ABSTRACT

A system for managing process automation with a macro bot is provided. By allowing for modifications to RPA bot behavior without changing the code of the RPA bots and providing for an efficient querying and reporting function, the system addresses a number of computer technology-centric challenges. The system allows the entity to push updates to bot behavior through a rules database without individually reconfiguring each bot. This ensures that the functionality of the bots may be updated for future entity needs and objectives while minimizing bot downtime. Furthermore, providing updates without changing the code of the bots allows the system to increase computing efficiency by reducing the demands on computer resources associated with applying a system-wide update, such as processing power, memory space, storage space, cache space, electric power, and networking bandwidth.

6 Claims, 4 Drawing Sheets

(56) References Cited

U.S. PATENT DOCUMENTS

| | | | |
|---|---|---|---|
| 2009/0037879 A1* | 2/2009 | Iyengar | H04L 41/0866 717/121 |
| 2013/0326031 A1* | 12/2013 | Duarte | G06F 9/5011 709/221 |
| 2013/0326032 A1* | 12/2013 | Duarte | G06F 9/5011 709/221 |
| 2016/0012366 A1 | 1/2016 | Srivastava et al. | |
| 2016/0019484 A1 | 1/2016 | Srivastava et al. | |
| 2016/0044380 A1 | 2/2016 | Barrett | |
| 2017/0173784 A1 | 6/2017 | Shah et al. | |
| 2017/0220324 A1 | 8/2017 | Balasubramanian et al. | |
| 2017/0228119 A1 | 8/2017 | Hosbettu et al. | |
| 2017/0330077 A1* | 11/2017 | Williams | G06N 3/04 |
| 2017/0372227 A1* | 12/2017 | Hosabettu | G06F 3/048 |
| 2018/0302346 A1* | 10/2018 | Xie | H04L 51/063 |
| 2018/0336326 A1* | 11/2018 | Wallace | G06F 21/577 |

\* cited by examiner

ROBOTICS PROCESS AUTOMATION MACRO BOT

FIELD OF THE INVENTION

The present invention embraces a platform-independent way to update the functions of a bot without changing the code portions of the bot or the applications with which the bot is associated.

BACKGROUND

Within an entity's network of computer systems, an entity may utilize a number of disparate applications to carry out the entity's objectives. The system may further utilize a number of bots which automate processes within the applications. That said, the applications may not all be written in the same programming language, may not utilize the same platforms, and thus may be incompatible with one another. In such a system, implementing a system-wide rule necessitates applying individual updates to the code of the bots and/or the applications with which they are associated. Accordingly, there is a need for a more efficient way to automate management of bots within a networked system.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention provide a system for automation of bot management. The system comprises an entity computing system comprising a first processor; a first communication interface; and a first memory having a macro bot application stored therein. The macro bot application, when executed by the first processor, causes the first processor to detect, from a user, a request to implement a first operations rule change; determine that a first data tower is associated with the first operations rule change, wherein the first data tower comprises a first set of execution data; and modify the first set of execution data within the first data tower, wherein the first set of execution data is associated with a first bot, wherein the first bot is associated with a first application. The system further comprises a bot computing system comprising a second processor; a second communication interface; and a second memory having a first bot application stored therein. The first bot application, when executed by the second processor, causes the second processor to receive, over a network, the first set of execution data from the first data tower, wherein the first set of execution data comprises instructions to interact with the first application and execute the instructions to interact with the first application.

In some embodiments, the macro bot application further causes the first processor to detect, from the user, a request to implement a second operations rule change; determine that a second data tower is associated with the second operations rule change, wherein the second data tower comprises a second set of execution data; and modify the second set of execution data within the second data tower, wherein the second set of execution data is associated with a second bot, wherein the second bot is associated with a second application. The second memory further comprises a second bot application, wherein the second bot application, when executed by the second processor, causes the second processor to receive, over a network, the second set of execution data from the second data tower, wherein the second set of execution data comprises instructions to interact with the second application; and execute the instructions to interact with the second application.

In some embodiments, the macro bot application further causes the first processor to retrieve a set of metadata associated with the first bot; detect from the set of metadata that the first bot is associated with the first rule operations change; and display a report on a graphical interface on a display of a user computing system, wherein the report comprises information associated with the first bot.

In some embodiments, the set of metadata associated with the first bot comprises the online status of the first bot and keywords related to the first bot's purpose.

In some embodiments, the macro bot application further causes the first processor to retrieve a set of metadata associated with the second bot; detect from the set of metadata that the second bot is associated with the second rule operations change; and display a report on a graphical interface on a display of a user computing system, wherein the report comprises information associated with the second bot.

In some embodiments, the set of metadata associated with the second bot comprises the online status of the second bot and keywords related to the second bot's purpose.

Embodiments of the present invention also provide computer program product for automation of bot management. The computer program product comprises at least one non-transitory computer readable medium having computer-readable program code portions embodied therein, the computer-readable program code portions comprising an executable portion for detecting, from a user, a request to implement a first operations rule change; an executable portion for determining that a first data tower is associated with the first operations rule change, wherein the first data tower comprises a first set of execution data; an executable portion for modifying the first set of execution data within the first data tower, wherein the first set of execution data is associated with a first bot, wherein the first bot is associated with a first application; an executable portion for receiving, over a network, the first set of execution data from the first data tower, wherein the first set of execution data comprises instructions to interact with the first application; and an executable portion for executing the instructions to interact with the first application.

In some embodiments, the computer-readable program code portions further comprise an executable portion for detecting, from a user, a request to implement a second operations rule change; an executable portion for determining that a second data tower is associated with the second operations rule change, wherein the second data tower comprises a second set of execution data; an executable portion for modifying the second set of execution data within the second data tower, wherein the second set of execution data is associated with a second bot, wherein the second bot is associated with a second application; an executable portion for receiving, over a network, the second set of execution data from the second data tower, wherein the second set of execution data comprises instructions to interact with the second application; and an executable portion for executing the instructions to interact with the second application.

In some embodiments, the computer-readable program code portions further comprise an executable portion for retrieving a set of metadata associated with the first bot; an executable portion for detecting from the set of metadata that the first bot is associated with the first rule operations change; and an executable portion for displaying a report on a graphical interface on a display of a user computing system, wherein the report comprises information associated with the first bot.

In some embodiments, the set of metadata associated with the first bot comprises the online status of the first bot and keywords related to the first bot's purpose.

In some embodiments, the computer-readable program code portions further comprise an executable portion for retrieving a set of metadata associated with the second bot; an executable portion for detecting from the set of metadata that the second bot is associated with the second rule operations change; and an executable portion for displaying a report on a graphical interface on a display of a user computing system, wherein the report comprises information associated with the second bot.

In some embodiments, the set of metadata associated with the second bot comprises the online status of the second bot and keywords related to the second bot's purpose.

Embodiments of the present invention also provide a computer-implemented method for automation of bot management, said method comprising detecting, from a user, a request to implement a first operations rule change; determining that a first data tower is associated with the first operations rule change, wherein the first data tower comprises a first set of execution data; modifying the first set of execution data within the first data tower, wherein the first set of execution data is associated with a first bot, wherein the first bot is associated with a first application; receiving, over a network, the first set of execution data from the first data tower, wherein the first set of execution data comprises instructions to interact with the first application; and executing the instructions to interact with the first application.

In some embodiments, the method further comprises detecting, from a user, a request to implement a second operations rule change; determining that a second data tower is associated with the second operations rule change, wherein the second data tower comprises a second set of execution data; modifying the second set of execution data within the second data tower, wherein the second set of execution data is associated with a second bot, wherein the second bot is associated with a second application; receiving, over a network, the second set of execution data from the second data tower, wherein the second set of execution data comprises instructions to interact with the second application; and executing the instructions to interact with the second application.

In some embodiments, the method further comprises retrieving a set of metadata associated with the first bot; detecting from the set of metadata that the first bot is associated with the first rule operations change; and displaying a report on a graphical interface on a display of a user computing system, wherein the report comprises information associated with the first bot.

In some embodiments, the set of metadata associated with the first bot comprises the online status of the first bot and keywords related to the first bot's purpose.

In some embodiments, the method further comprises retrieving a set of metadata associated with the second bot; detecting from the set of metadata that the second bot is associated with the second rule operations change; and displaying a report on a graphical interface on a display of a user computing system, wherein the report comprises information associated with the second bot.

In some embodiments, the set of metadata associated with the second bot comprises the online status of the second bot and keywords related to the second bot's purpose.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Bot" as used herein may refer to a software application that performs automated tasks. In particular, a plurality of bots may be used by an entity to perform various functions for high-volume applications that relate to the entity's objectives. Typically, a bot will be configured to repeatedly perform a specific task. Each bot may be configured to utilize particular protocols and be compatible with particular platforms and applications. In some embodiments, a bot may be configured to execute its tasks by interacting with other applications within the entity's systems at the interface level (i.e. by providing inputs to the interfaces of the other applications).

"Entity" as used herein may refer to an individual or an organization that owns and/or operates a system of networked computing devices and/or systems on which a plurality of bots are implemented. The entity may be a business organization, a non-profit organization, a government organization, and the like.

"User" as used herein may refer to an individual who may log onto the system to view and/or manage the functioning of the macro bot and/or the individual bots under the macro bot's control. Typically, the user is authorized by the entity to access the system.

"Computing system" as used herein may refer to a networked computing device within the entity system. The computing system may include a processor, a non-transitory storage medium, a communications device, and a display. The computing system may support user logins and inputs from any combination of similar or disparate devices. Accordingly, the computing system may be a portable electronic device such as a smartphone, tablet, or laptop, or the computing may be a stationary unit such as a personal desktop computer or networked terminal within an entity's premises. In some embodiments, the computing system may be a local or remote server which is configured to send and/or receive inputs from other computing systems on the network.

"Layer" as used herein may refer to an abstraction in the software context. In particular, the entity system may utilize multiple abstraction layers to generalize and simplify algorithms to be used in specific applications. For instance, utilizing abstraction layers in this manner may allow the entity system to apply changes to general rules (e.g. input data) without changing the specific implementations of the rules (e.g. changing a particular bot's behavior on the code level).

Embodiments of the present invention provide a system, computer program product, and method for managing process automation with a macro bot. In particular, an entity system utilizes the macro bot to manipulate inputs to lower bots within the system and generate reports based on the outputs of the lower bots. In some embodiments, said lower bots may be robotic process automation ("RPA") bots, which interacts with various applications within the entity system at the interface level. In such embodiments, an RPA bot may be configured to perform specific tasks within the application by reading data from a rules database or databases. The rules database may contain execution data that directs the manner in which the RPA bot performs said specific tasks within a particular application. As the entity system may utilize a plurality of applications that differ in protocol or platform, each RPA bot may be configured to interact with the interface of each particular application. The macro bot may modify the execution data within the rules database according to the requirements or objectives of the entity. In this way, the system is able to modify the behavior of the RPA bots to comply with the entity's requirements and objectives without altering the code of the RPA bots or the applications associated with the RPA bots, and thus provides a platform-agnostic method of automation.

The macro bot may further be configured to perform reporting functions to report the status and functioning of the RPA bots. Accordingly, each RPA bot may comprise metadata associated with the RPA bot. The metadata may comprise information about the individual RPA bot's attributes, which may include information about the protocols or platforms of the applications with which the RPA bot is configured to interact. The metadata may further comprise keywords that may identify the purpose and/or specific tasks of the RPA bot. Using this metadata, the macro bot may compile a query of RPA bots based on a user input. For example, the user may request a query of all RPA bots currently configured to execute tasks related to a particular area of the entity's operations. The macro bot may search the metadata of the RPA bots according to the query and generate a report based on the results. Information associated with the RPA bots may be contained in a global bot inventory stored within a database. The report may comprise information about which RPA bots are associated with the particular area of the entity's operations, the status of said RPA bots, whether a particular RPA bot will be affected by a change to execution data in the central database, and the like. The report may be displayed to the user through a dashboard on a graphical interface. The dashboard may contain buttons or areas that receive user input, such as text entry boxes, clickable buttons, check boxes, or radio buttons, through which a user may submit a query of the RPA bots. The dashboard may further comprise a query results panel, through which the macro bot displays the results of the query of RPA bots to the user.

By allowing for modifications to RPA bot behavior without changing the code of the RPA bots and providing for an efficient querying and reporting function, the system addresses a number of computer technology-centric challenges. The system allows the entity to push updates to bot behavior through a rules database without individually reconfiguring each bot. This ensures that the functionality of the bots may be updated for future entity needs and objectives while minimizing bot downtime. Furthermore, providing updates without changing the code of the bots allows the system to increase computing efficiency by reducing the demands on computer resources associated with applying a system-wide update, such as processing power, memory space, storage space, cache space, electric power, and networking bandwidth.

Figure 1:
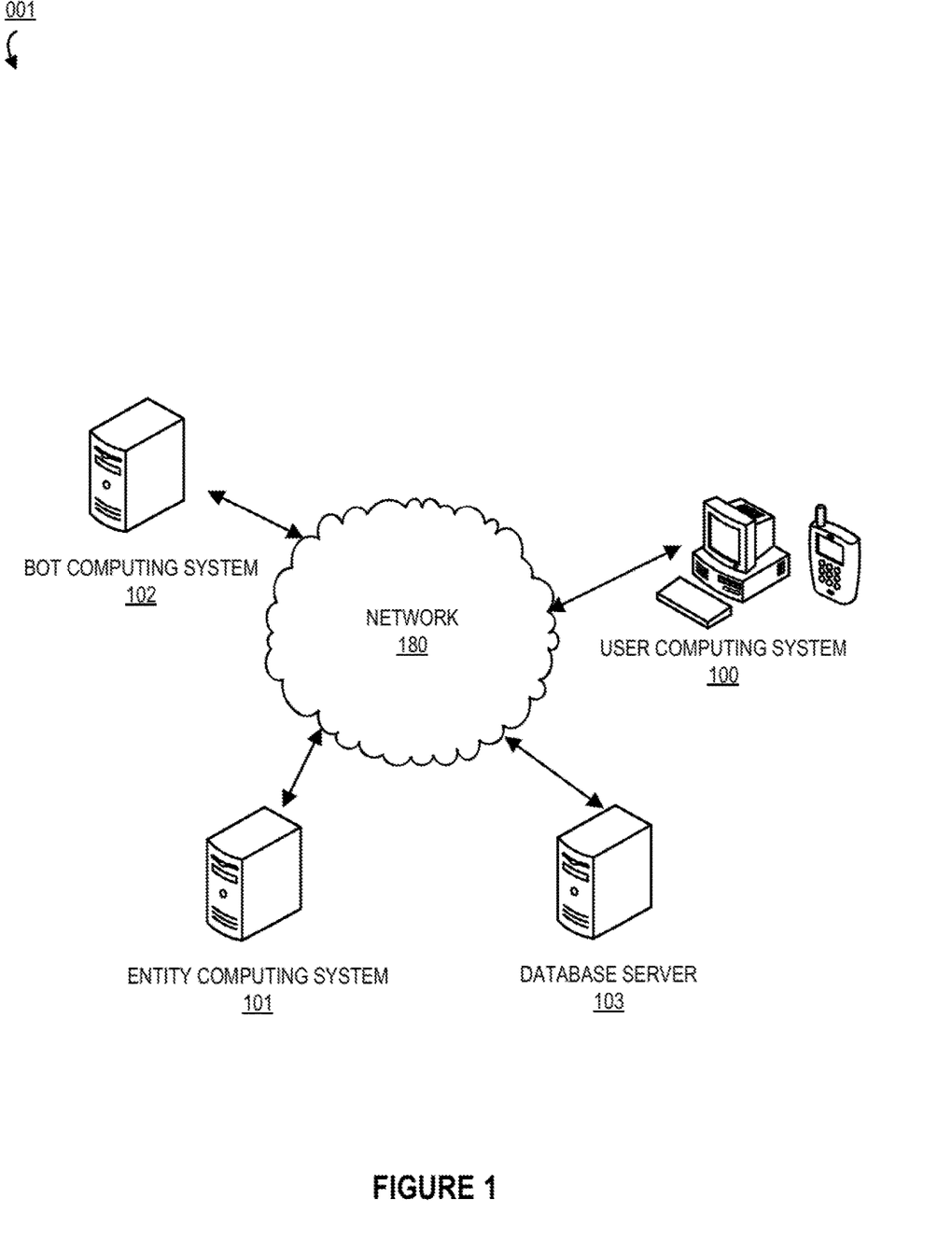
FIG. 1 depicts an operating environment, in accordance with one embodiment of the present invention.

FIG. 1 is a block diagram illustrating an operating environment 001, in accordance with one embodiment of the present invention. The operating environment may include a user computing system 100 in operative communication with an entity computing system 101 and a bot computing system 102 over a network 180. The network 180 may also be a global area network (GAN), such as the Internet, a wide area network (WAN), a local area network (LAN), or any other type of network or combination of networks. The network 180 may provide for wireline, wireless, or a combination wireline and wireless communication between devices on the network 180. The user computing system may be a mobile device such as a smartphone, tablet, or laptop, a personal computing device such as a desktop computer, smart device, single board computer, or a device owned and operated by an entity, such as a computer system terminal located on the entity's premises. Typically, the entity computing system 101 is responsible for running the macro bot, and the bot computing system 102 is responsible for running one or more RPA bots. The entity computing system 101 may further comprise a rules database which stores execution data to be used by the RPA bots. It should be understood that the entity computing system 101 as depicted herein may be embodied in a single server or multiple servers distributed over varying geographic distances. Accordingly, it should be further understood that the central database may exist on a single server or on multiple servers in a distributed configuration. In other embodiments, the rules database may be stored on a system separate from the entity computing system 101, such as on a database server 103. In such an embodiment, the database server 103 may comprise the rules database which contains the execution data from which the bot computing system 102 obtains its commands. The database server 103 may further comprise an operations database, from which the RPA bot pulls the operations data it requires to fulfill its tasks.

Typically, the macro bot on the entity computing system 101 modifies the rules database stored on the database server 103 to modify the execution data (e.g. command inputs) to be received by the RPA bot on the bot computing system 102. The RPA bot pulls the execution data from the rules database 103 and executes commands based on the execution data. The RPA bot also pulls the operations data required to execute said commands from an operations database stored on the database server 103. Furthermore, user computing systems 100 are used to log onto the entity computing system 101 over the network 180 to access the online portal, which comprises the graphical interface (e.g., over a secure communication channel). The user computing system 100 may allow the user to manage the operations of the macro bot as well as utilize the reporting functionality of the macro bot. The entity computing system 101 may require that authentication credentials are provided by the user computing system 100. In some embodiments, the authentication credentials may include a username, password, a biometric identifier, a cryptographic key, a token, and the like. The entity computing system 101 may further require that more than one authentication credential is provided as parts of a multi-step authentication process. Once the user has been authenticated, the user may log on to the online portal on the entity computing system 101 using the user computing system 100 to access and manage the macro bot.

Figure 2:
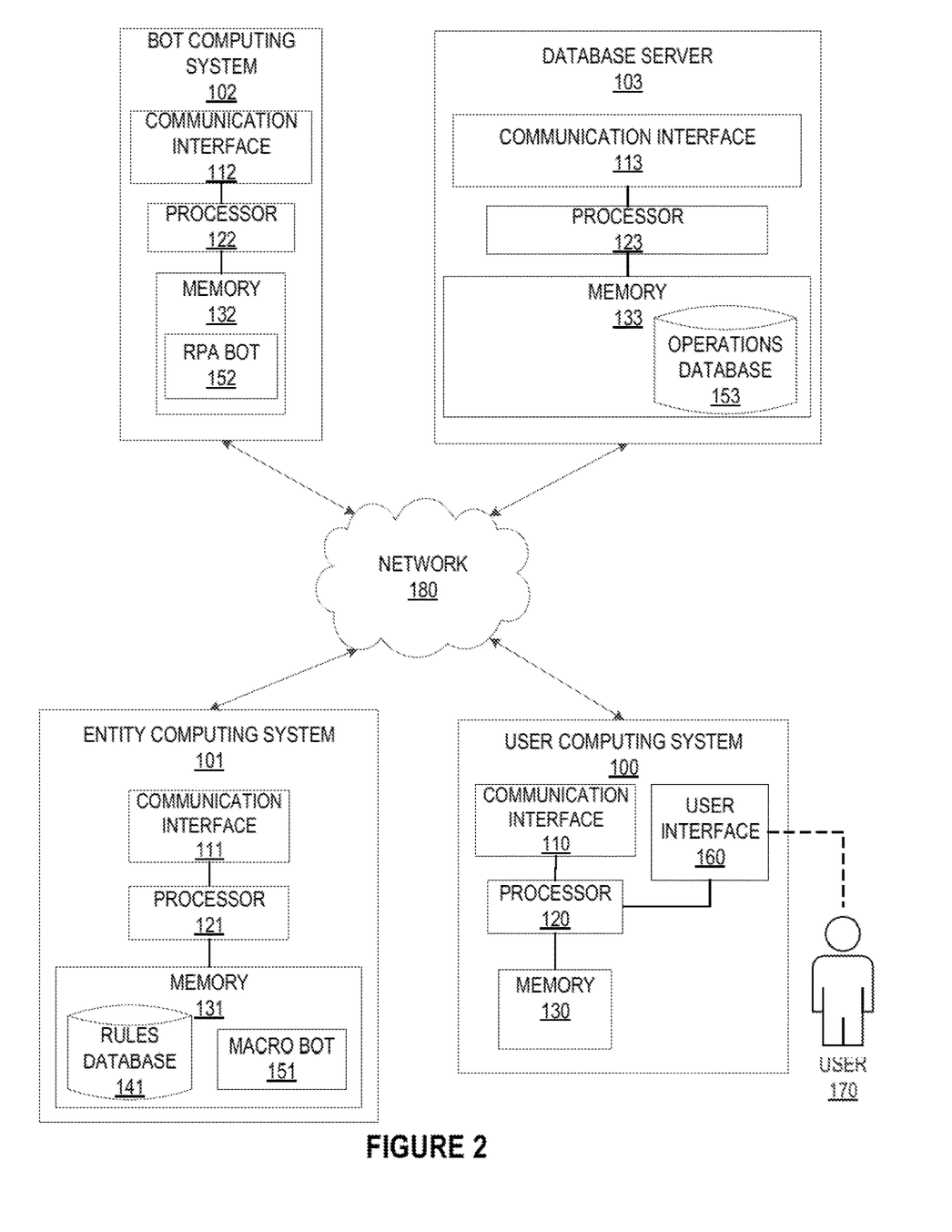
FIG. 2 depicts a schematic of an entity computing system, a bot computing system, a database server, and a user computing system, in accordance with one embodiment of the present invention.

FIG. 2 is a block diagram illustrating the entity computing system 101, the user computing system 100, the bot computing system 102, and the database server 103 in more detail, in accordance with one embodiment of the present invention. The entity computing system 101 typically contains a processor 121 communicably coupled to such devices as a communication interface 111 and a memory 131. The processor 120, and other processors described herein, typically includes circuitry for implementing communication and/or logic functions of the entity computing system 101. For example, the processor 121 may include a digital signal processor device, a microprocessor device, and various analog to digital converters, digital to analog converters, and/or other support circuits.

The entity computing system may use the communication interface 111 to communicate with other devices over the network 180. The communication interface 111 as used herein may include an Ethernet interface, an antenna coupled to a transceiver configured to operate on a cellular data or WiFi signal, and/or a near field communication ("NFC") interface.

The entity computing system may include a memory 131 operatively coupled to the processor 121. As used herein, memory includes any computer readable medium (as defined herein below) configured to store data, code, or other information. The memory may include volatile memory, such as volatile Random Access Memory (RAM) including a cache area for the temporary storage of data. The memory may also include non-volatile memory, which can be embedded and/or may be removable. The non-volatile memory can additionally or alternatively include an electrically erasable programmable read-only memory (EEPROM), flash memory or the like.

The bot computing system 102 may comprise a communication interface 112, a processor 122, and a memory 132 having an RPA bot 152 stored thereon. The RPA bot may be configured to repeatedly execute a specific task in high volume applications. In particular, the RPA bot may be configured to efficiently execute a linear task within the interface of a particular application. For instance, an RPA bot may be configured to populate electronic forms with inputted data, such as customer information. The memory 132 may further comprise a rules database 141. The rules database 141 may contain execution data, which the RPA bot accesses over the network 180.

The database server 103 may also comprise a communication interface 113, a processor 123, and a memory 133 having an operations database 153 stored thereon. It should be appreciated that the rules database 141 may also exist as a single logical database distributed amongst a plurality of computing systems. The execution data contains instructions that causes the RPA bot to perform certain steps within the application associated with the RPA bot. The operations database 153 may contain the data required by the RPA bot to execute its functions. For instance, if an RPA bot is configured to populate electronic forms with customer data, the operations database 153 may contain the customer data required by the RPA bot to populate the electronic forms. Accordingly, the execution data within the rules database 141 may control the access to data within the operations database 153 as well as the manner in which the data is accessed. For instance, the execution data may limit the types of accessible data according to the identity of the RPA bot.

Typically, a macro bot 151 is stored within the memory 130, which causes the processor 121 on the entity computing system 101 to perform the various management and reporting functions of the macro bot. In particular, the macro bot 151 adds, deletes, or modifies the execution data within the rules database 141. In this way, the macro bot 151 is able to efficiently manage the activity of a plurality of RPA bots 152 which may be configured to interact with disparate applications running on different platforms.

The user computing system 100 typically also includes a processor 120 operatively coupled to a communication interface 110 and a memory 130. The memory 130 may contain an application which causes the processor 120 to display a user interface 160 to the user 170. It should be understood that the display on which the user interface 160 is presented may include an integrated display (e.g. a tablet or smartphone screen) within the user computing system 100, or an external display device (e.g. a computer monitor or television). The application within the memory 130 may be a client application to allow the user 170 to access the macro bot 151. In other embodiments, the application within the memory 130 may be a general purpose application such as a web browser. The application, upon receiving input from the user 170, causes the processor 120 to, through the communication interface 110, establish a communication link to the communication interface 111 of the entity computing system 101 to allow the user 170 to access and manage the macro bot 151. Once the communication link is established, the user 170 accesses the macro bot 151 through the user interface 160. The user interface 160 may allow the user 170 to input new rules to be implemented by the macro bot 151 into the rules database 141. For instance, the new rules may reflect changes in policy within the entity with respect to the manner in which the RPA bots 152 are to carry out their tasks, such as a restriction on which RPA bot 152 may access certain types of data within the operations database 153. In other embodiments, the new rules may reflect the entity's compliance with legal or regulatory restrictions, such as those that limit how RPA bots utilize sensitive information within the operations database 153, such as customer information. The macro bot 151 receives the rules inputted by the user 170 and modifies the execution data within the rules database 141 to reflect the user input. The user interface 160 may further allow the user 170 to utilize the reporting functions of the macro bot 151. In particular, the macro bot 151 may generate a report, either in anticipation of or after the implementation of a particular rule. Said report may include various types of information about the RPA bots, such as which bots will be or have been affected by a change in the execution data, the status of the RPA bots affected (e.g. whether the RPA bot is offline or online, whether the RPA bot is currently performing a task, the workload of the RPA bot, and the like). Based on the information in the report, the macro bot 151 may then redistribute the tasks of one RPA bot 151 to additional RPA bots to ensure efficient workload distribution as well as to provide a failsafe for RPA bot 151 downtime.

Figure 3:
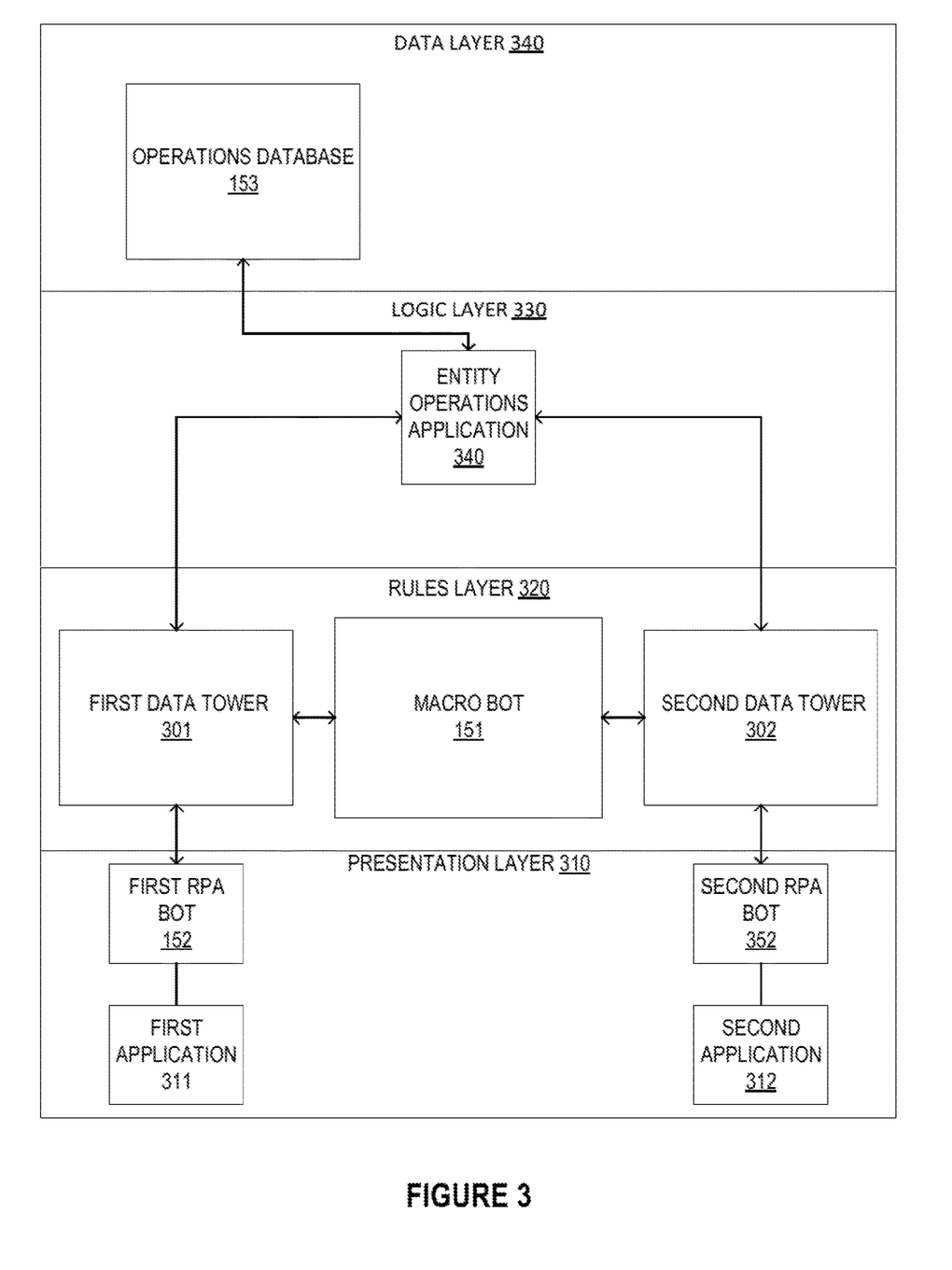
FIG. 3 depicts a schematic illustrating the logical layout of the macro bot system, in accordance with one embodiment of the present invention.

FIG. 3 illustrates a logical layout of the macro bot system, in accordance with one embodiment of the present invention. The first RPA bot 152 and the second RPA bot 352 operate within the presentation layer 310, which is the highest level of abstraction. Each RPA bot is configured to interact with an application specific to the tasks the RPA bot has been programmed to execute. Typically, the bot will be programmed to interact with the application at the interface level rather than at the code level. For example, the bot may be programmed to select certain functions of the application through the graphical interface, such as by activating buttons, using text entry boxes, and the like. In this way, the bot may be coded in a different programming language from the application and allows the bot to be agnostic of the particular platform of the application. As seen in FIG. 3, the first RPA bot 152 may be configured to interact with a first application 311, and the second RPA bot 352 may be configured to interact with the second application 312.

RPA bots may obtain execution instructions from a data tower, which is a logical structure that exists within the rules database of the entity computing system. The data tower exists within the rules layer 320 along with the macro bot 151, and dictates the functioning of one or more RPA bots that are programmed to execute a particular function. In particular, the data tower stores the execution data that the RPA bot uses to carry out its specific functions. As seen in FIG. 3, a first data tower 301 provides instructions to the first RPA bot 152, and a second data tower 302 provides instructions to the second RPA bot 352. For instance, if the entity is a financial institution, the first RPA bot 152 may be configured to process documents for loan applications. The first data tower may selectively provide executable instructions to those RPA bots that are programmed to process the loan applications (e.g. the first RPA bot 152). The executable instructions, for example, may direct the first RPA bot 152 to populate selected areas of a form within the first application 311 using specific types of customer data. To further illustrate, the second RPA bot 352 may be configured to calculate a risk associated with a particular customer. In such an embodiment, the second data tower 302, which may contain executable instructions for the RPA bots that calculate the risk (e.g. the second RPA bot 352), provides instructions to the second RPA bot, which uses customer data to populate a form in the second application 312, which may calculate the risk.

The macro bot 151, which exists in the rules layer 320 (i.e. the second highest layer of abstraction), manages the executable instructions within each data tower. In particular, the macro bot 151 is configured to receive input from the user, where the input includes a change to the rules of operation for RPA bots. For example, the input may include rules that change the types of customer data that may or may not be processed by the RPA bots, or the rules may change how such customer data is required to be treated in accordance with the rules of the entity or a regulatory body. Upon receiving the input from the user, the macro bot 151 identifies the data towers that contain the execution data related to the rule to be implemented. In some embodiments, the rules may apply to all data towers, and the execution data for all data towers will be modified in accordance with the rule received by the macro bot 151. In other embodiments, the rules may pertain to a particular data tower (e.g. the first data tower 301 which may be configured to process loan applications). The macro bot 151 modifies the execution data within the data towers associated with the rule to be implemented, ensuring that the RPA bots, which reads the execution data from the data towers, will remain in compliance with the change in rules. Accordingly, an update to operating rules may be applied to multiple RPA bots which may interact with applications which may not be compatible with each other. For an entity which may undergo changes to its rules or regulations on a rolling basis, this functionality greatly improves the efficiency of the computing systems within the entity system by preventing the need to modify the code of the individual applications to account for changes in entity rules. In other words, the macro bot 151 allows a user to implement system-wide rules at an abstract level without a concern for the specific implementations for each RPA bot.

The macro bot 151 may further be configured to generate reports relating to the RPA bots. In some embodiments, the macro bot 151 may be configured to generate a report on an "on demand" basis through a user request received through the user computing system. In other embodiments, the macro bot 151 may be configured to periodically generate reports within a particular timeframe. In yet other embodiments, the macro bot 151 may generate a report when a rule to be implemented is received from the user. For example, the report may contain a list of RPA bots that will be affected by a rule to be implemented. The report may further indicate which bots are currently operational or non-operational. To accomplish this, the macro bot 151 reads the metadata associated with the individual RPA bots. The metadata may contain information such as keywords about a particular bot's attributes, such as the applications with which the bot is associated or the specific tasks the bot is programmed to execute.

An entity operations application 340 exists within the logic layer 330 (i.e. the second lowest layer of abstraction). The entity operations application 340 comprises computer program code that executes the general operations necessary to the entity. For instance, if the entity is a financial institution, the entity operations application 340 may comprise the business logic for the entity system. Typically, the business logic or application code within the entity operations application 340 is not modified by the macro bot. The entity operations application 340 may be responsible for deciding when an RPA bot performs its specific tasks. The entity operations application 340 may further provide the RPA bot with the data required to perform the RPA bot's function. For instance, the entity operations application 340 may retrieve customer data within the operations database 153 and make the data available to the RPA bot such that the RPA bot may use the data to populate forms within the application associated with the RPA bot.

Finally, the operations database 153 exists at a data layer 340 (i.e. the lowest level of abstraction). The operations database 153 contains the operations data needed by the RPA bots to perform its functions. For example, the operations database 153 may contain data associated with a customer, such as biographical information, account information, transfer data, and the like. Said customer data may be available to the RPA bots through the entity operations application 340, which the RPA bots will use to carry out their functions, such as populating forms or calculating loss possibility.

Figure 4:
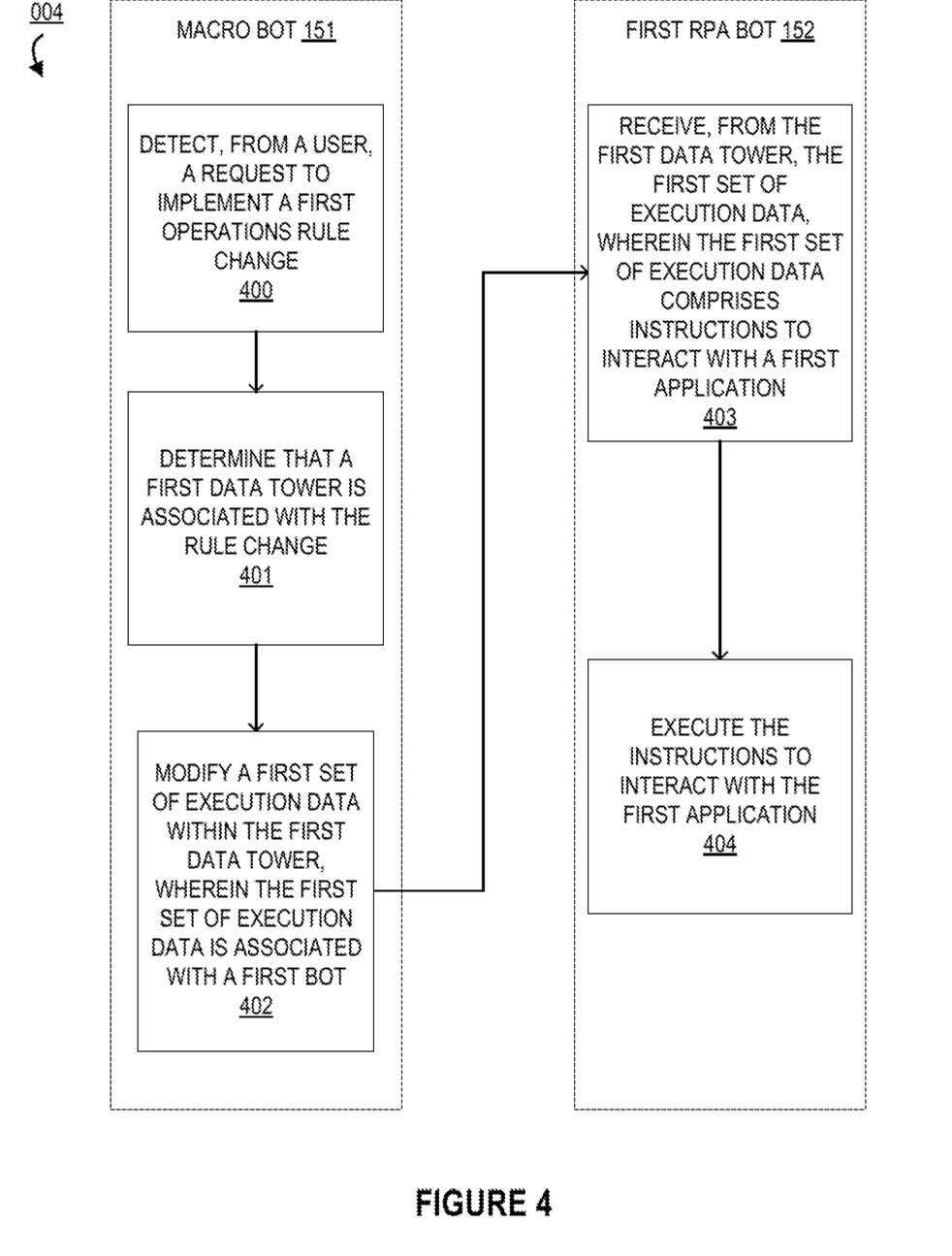
FIG. 4 depicts a process flow for using a macro bot to manage bot behavior, in accordance with one embodiment of the present invention.

FIG. 4 illustrates a process flow of the macro bot system, in accordance with one embodiment of the present invention. The process begins at block 400, where the macro bot detects, from a user, a request to implement a first operations rule change. The operations rule change will typically be requested as a result in a change in policy within the entity. Accordingly, the plurality of RPA bots within the system will necessitate a change in operations (i.e. the manner in which the bot carries out its functions) to ensure that the functioning of the bots complies with an entity's rules and/or regulations. Typically, the user logs into the entity's system and manages requests through a graphical interface. The graphical interface may contain areas to receive input from the user, such as text boxes or clickable items. Using said areas, the user may articulate the bounds of the operations rule change and submit a request to the system. The user may further be able to specify the subject matter of the operations rule change (e.g. changes to the way customer data is handled).

Upon the macro bot receiving the request, the process continues to block 401, where the macro bot determines that a first data tower is associated with the rule change. The macro bot accomplishes this by reading the subject matter of the operations rule change request from the user. The macro bot, by reading the metadata associated with the RPA bots within the global bot library, then identifies the RPA bots that will be affected by the operations rule change as well as the data tower(s) that store the execution data for those RPA bots affected. The macro bot then converts the operations rule change request into a data format that may be utilized by the RPA bots. In an exemplary embodiment, the macro bot may determine that the first data tower is associated with the rule change. The macro bot may then convert the rule change request into a format that can be read by the first RPA bot, which is associated with the first data tower.

The process continues to block 402, where the macro bot modifies a first set of execution data within the first data tower, wherein the first set of execution data is associated with a first bot. Upon identifying the data tower and RPA bots associated with the rule change, the macro bot modifies the execution data within the data tower according to the converted operations rule change request. In this way, the macro bot may change the functioning of the RPA bots which depend on a particular data tower by modifying the execution data within the data tower. In an exemplary embodiment, a first data tower may contain execution data associated with a first bot. The macro bot may modify the execution data within the first data tower according to the user provided operations rule change request, which will ensure that the first RPA bot will execute its commands in compliance with the rule change for all of its operations thereafter.

The process continues to block 403, where the first RPA bot receives, from the first data tower, the first set of execution data, wherein the first set of execution data comprises instructions to interact with a first application. At this step, the modified execution data is read by the first RPA bot. The modified execution data, which now incorporates the operations rule change, will cause the first RPA bot to execute its commands in compliance with the rules change and ultimately the rules imposed by the entity or other organization. The first RPA bot may be configured to interact with the first application.

Finally, the process concludes at block 404, where the first RPA bot executes the instructions to interact with the first application. At this step, performs the steps according to the instructions within the modified execution data. In an exemplary embodiment, the modified execution data may contain modifications to the places in which certain customer information (e.g. account information) must be placed into an electronic form. In such an embodiment, the first RPA bot may retrieve said customer information from the operations database and insert the data into the forms within the first application. The first application, for instance, may be an application to manage customer account information. Accordingly, an efficient and platform-agnostic way to push updates to RPA bots is provided.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other than the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for automation of bot management, comprising:
    an entity computing system comprising:
    a first processor;
    a first communication interface; and
    a first memory having a macro bot application stored therein, wherein the macro bot application, when executed by the first processor, causes the first processor to:
        receive, from a user, a request to implement a first operations rule change;
        determine that one or more first Robotic Process Automation (RPA) bots from a plurality of RPA bots are affected by the first operations rule change;
        determine that one or more first data towers are associated with the one or more first RPA bots, wherein the one or more first data towers store a first set of execution data; and
        modify the first set of execution data within the one or more first data towers in accordance with the first operation change, wherein modifying the first set of execution data comprises converting the first operations rule change to a data format readable by the one or more first RPA bots; and
    a RPA bot computing system comprising:
    a second processor;
    a second communication interface; and
    a second memory having at least one first application stored therein that is executed by the one or more first RPA bots, wherein the at least one application, when executed by the second processor, causes the second processor to:
        receive, over a communication network, the modified first set of execution data from one of the one or more first data towers, wherein the modified first set of execution data comprises first instructions to interact with the at least one first application; and
        execute, by the one or more first RPA bots, the first instructions to interact with the at least one first application, wherein the first instructions are executed without altering code associated with the one or more first RPA bots and code associated with the at least one first application.

2. The system according to claim 1, wherein the macro bot application further causes the first processor to:
    receive, from the user, a request to implement a second operations rule change;
    determine that one or more second Robotic Process Automation (RPA) bots from the plurality of RPA bots are affected by the second operations rule change;

determine that one or more second data towers are associated with the one or more second RPA bots, wherein the one or more second data towers store a second set of execution data; and modify the second set of execution data within the one or more second data towers in accordance with the second operation change; and wherein the second memory further stores at least one second application that is executed by the one or more second RPA bots, wherein the at least one second application, when executed by the second processor, causes the second processor to:

receive, over a communication network, the modified second set of execution data from one of the one or more second data towers, wherein the modified second set of execution data comprises second instructions to interact with the at least one second application; and execute, by the one or more second RPA bots, the second instructions to interact with the at least one second application wherein the second instructions are executed without altering code associated with the one or more second RPA bots and code associated with the at least one second application.

3. The system according to claim 1, wherein the macro bot application further causes the first processor to:

retrieve a set of metadata associated with the one or more first RPA bots;

detect from the set of metadata that the one or more first RPA bots are associated with the first rule operations change; and display a report on a graphical interface on a display of a user computing system, wherein the report comprises information associated with the one or more first RPA bots.

4. The system according to claim 3, wherein the set of metadata associated with the one or more first RPA bots comprises an online status of the one or more first RPA bots and keywords related to the one or more first RPA bots' purpose.

5. The system according to claim 2, wherein the macro bot application further causes the first processor to:

retrieve a set of metadata associated with the one or more second RPA bots;

detect from the set of metadata that the one or more second RPA bots are associated with the second rule operations change; and display a report on a graphical interface on a display of a user computing system, wherein the report comprises information associated with the one or more second RPA bots.

6. The system according to claim 5, wherein the set of metadata associated with the one or more second RPA bots comprises an online status of the one or more second RPA bots and keywords related to the one or more second RPA bots' purpose.

* * * * *